United States Patent
Pinault

Patent Number: 5,706,317
Date of Patent: Jan. 6, 1998

[54] SYNCHRONIZATION DEVICE FOR A TERMINAL OF A RADIO COMMUNICATION SYSTEM

[75] Inventor: Francis Pinault, Bois Colombes, France

[73] Assignee: Alcatel Mobile Phones, Paris, France

[21] Appl. No.: 532,619

[22] PCT Filed: Apr. 7, 1994

[86] PCT No.: PCT/FR94/00389

§ 371 Date: Oct. 6, 1995

§ 102(e) Date: Oct. 6, 1995

[87] PCT Pub. No.: WO94/24833

PCT Pub. Date: Oct. 27, 1994

[30] Foreign Application Priority Data

Apr. 9, 1993 [FR] France .................. 93 04255

[51] Int. Cl.⁶ ............................................. H04L 7/00
[52] U.S. Cl. .................. 375/354; 455/34.2; 455/184.1
[58] Field of Search ............................... 455/33.2, 34.1, 455/34.2, 226.2, 150.1, 161.1, 161.3, 166.1, 179.1, 184.1, 185.1, 186.1; 379/58–61; 370/310, 329, 331; 375/354

[56] References Cited

U.S. PATENT DOCUMENTS 5,093,927  3/1992  Shanley ................. 455/34
5,418,839  5/1995  Knuth et al. .............. 379/61
5,594,944  1/1997  Ogata et al. ............ 455/34.1

FOREIGN PATENT DOCUMENTS

0486089A3  5/1992  European Pat. Off. .
0522885A3  1/1993  European Pat. Off. .

Primary Examiner—Stephen Chin
Assistant Examiner—Amanda T. Le
Attorney, Agent, or Firm—Sughrue, Mion, Zinn, Macpeak & Seas, PLLC

[57] ABSTRACT

A synchronization device for a terminal of a radio communication system, adapted to identify a control channel constituting one of a plurality of receive channels by means of a receiver (2) comprises means (3) to measure the power of the receive channels and means (4) for attempting synchronization to at least some of said channels identified in a list (5), and is characterized in that, the system being such that a reference channel ($C_r$) of nominal power ($P_r$), its ith predecessor ($C_{r-i}$) and its ith successor ($C_{r+i}$) have an ith attenuation ($A_i$) when the receiver (2) is tuned to the reference channel ($C_r$), it comprises selection means whereby the ith predecessor ($C_{r-i}$) or the ith successor ($C_{r+i}$) do not appear in the list if its power is less than the nominal power ($P_r$) of the reference channel ($C_r$) reduced by the ith attenuation ($A_i$).

3 Claims, 2 Drawing Sheets

SYNCHRONIZATION DEVICE FOR A TERMINAL OF A RADIO COMMUNICATION SYSTEM

BACKGROUND OF THE INVENTION

1. Field of the Invention

The present invention concerns a synchronization device for a terminal of a radio communication system.

2. Description of the Related Art

In radio communication systems such as the pan-European digital cellular mobile radio system known as the GSM system, for example, calls between a terminal and a base transceiver station are conveyed by radio signals in communication channels. These systems comprise a plurality of channels for transmission from the terminals to the base transceiver stations or for transmission from the base transceiver stations to the terminals.

The latter channels include a control channel transmitted continuously to enable a terminal to access the system via the base transceiver station transmitting that channel in order to be able to set up calls. The terminal must therefore identify this control channel in order to acquire the information it needs to log onto the system. This information includes synchronization information and for this reason this procedure is usually referred to as the synchronization procedure.

The solution most widely adopted is a two-stage synchronization procedure. In the first stage the terminal measures the power of all received channels. The terminal then attempts to synchronize to the channel received at the highest power and, if it fails to synchronize to this channel, it attempts to synchronize to the other channels in order of decreasing receive power until it is able to synchronize. This solution is that set out in GSM Recommendations 4.08 version 3.11.0 and 5.08 version 3.7.0.

The synchronization procedure is systematically executed when the terminal is switched on and also, more generally, after loss of synchronization, i.e. if the radio link on the control channel between the base transceiver station and the terminal is interrupted. This interruption may be intentional, for example if the terminal is switched off, or unintentional. The terminal may be temporarily unable to synchronize because radio reception conditions are unsatisfactory. This occurs if the terminal is in a tunnel, for example, or more generally when it is in a shadow area in the radio sense of this term.

In this case the terminal will attempt to synchronize to each receive channel in succession during a synchronization period without succeeding and will resume the attempt in repetitive synchronization periods until such time as reception conditions are again adequate. The synchronization period can be of long duration, depending on the number of receive channels and the time allotted to the terminal to attempt to synchronize to a channel. This period can be in the order of 14 seconds in the GSM system, for example. During a synchronization period, the duration of which is predetermined in this case, the terminal is unable to set up any call and is therefore unavailable.

SUMMARY OF THE INVENTION

An object of the present invention is to reduce the synchronization period.

This object is achieved by providing in the terminal a synchronization device adapted to identify a control channel constituting one of a plurality of receive channels by means of a receiver, comprising means to measure the power of the receive channels and means for attempting synchronization to at least some of the channels identified in a list. The device is characterized in that, the system being such that a reference channel, its ith predecessor and its ith successor have an ith attenuation when the receiver is tuned to said reference channel, it comprises selection means whereby the ith predecessor or the ith successor do not appear in the list if its power is less than the nominal power of the reference channel reduced by the ith attenuation.

Accordingly, the list that could initially include all of the receive channels is shortened by eliminating channels with a power substantially lower than that of the adjacent channel or channels. The effect of this is to reduce the synchronization period.

The invention will emerge more clearly from the following description of embodiments given by way of example with reference to the appended drawings.

DETAILED DESCRIPTION OF THE PREFERRED EMBODIMENT

Figure 1:
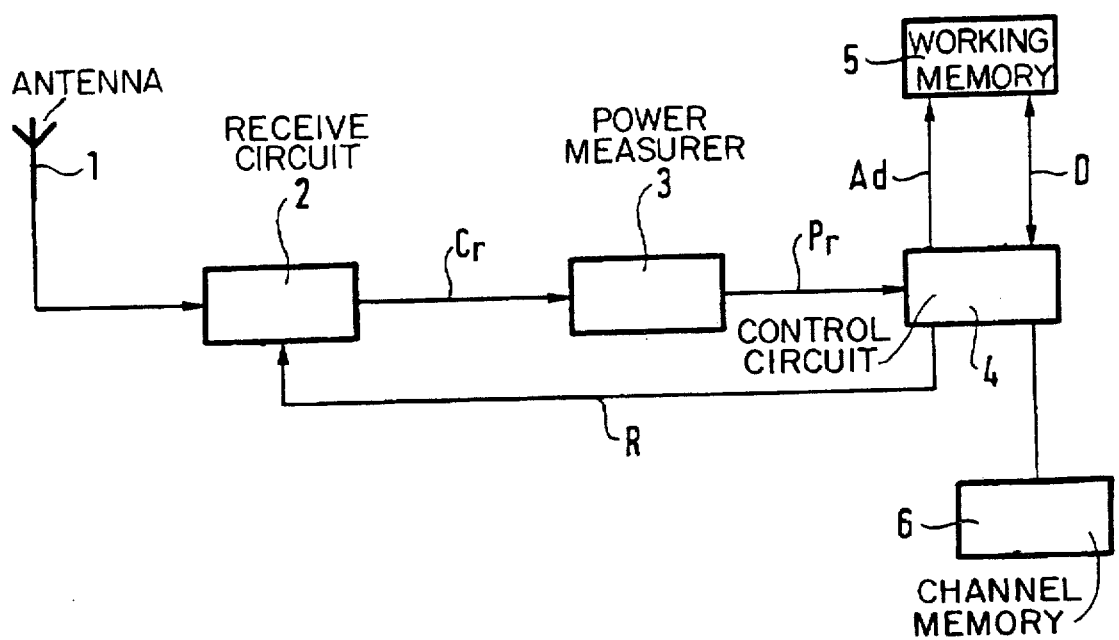
FIG. 1 shows the component parts of a terminal for implementing the invention.

Although it represents a somewhat strained use of the terminology, for the sake of simplicity a channel and the radio signal it conveys will be regarded as one and the same in the remainder of the description, each channel being characterized by the corresponding radio signal carrier frequency.

In a manner that is known in itself, the terminal includes an antenna 1 adapted to receive the various channels, a receive circuit 2 such as a frequency synthesizer connected to the antenna 1 and which selects from the channels received a particular channel $C_r$ in response to an adjustment signal R, a power measuring circuit 3 which produces a power signal $P_r$ representing the power of the channel Cr, and a control circuit 4 such as a microprocessor which produces the adjustment signal R and which receives the power signal $P_r$ which it stores in a working memory 5 in the form of a data signal D at an address assigned to the channel $C_r$, by means of an address signal Ad.

Also in a manner that is known in itself, the control circuit 4 has access to the identity of all the channels that the terminal can receive. For example, it comprises a channel memory 6 associating with each channel a set point value of the adjustment signal R at an address in the working memory 5. Thus, initially, the control circuit 4 produces the adjustment signal R having one of the set point values and stores the value of the power signal P in the working memory 5 at the address associated with that set point value in the channel memory 6. The control circuit repeats this operation for all the set point values with the result that the working memory 5 contains a list of s records each assigned to one channel $C_r$, each record associating with a channel $C_r$ the corresponding set point value and the power $P_r$ at which it is received. The channels $C_r$ are advantageously classified in order of increasing frequency.

The person skilled in the art is well aware that a signal transmitted at a precise frequency is also present at a lower power level on neighboring frequencies, if only because of the bandwidth of the signal and the specifications of the transmitter equipment. Similarly, because it necessarily has a restricted selectivity, a receiver equipment receives not only the signal corresponding to the frequency to which it is tuned but also, in an attenuated form, signals transmitted at neighboring frequencies.

In the case of interest here this phenomenon causes the receive circuit 2, when it is tuned to the channel $C_r$, to receive this channel at its nominal power $P_r$ and also the channels $C_{r-1}$ and $C_{r+1}$ at their nominal power reduced by a first attenuation factor $A_1$. It also receives the channels $C_{r-2}$ and $C_{r+2}$ at their nominal powers $P_{r-2}$ and $P_{r+2}$ reduced by a second attenuation factor $A_2$, and it is possible in this way to increase the number of neighboring channels $C_{r-i}$ and $C_{r+i}$ of the reference channel $C_r$ received with an ith attenuation factor $A_i$ relative to their nominal power. This phenomenon is so well known that it is usually specified in transmission systems. In the GSM system, for example, it is specified that a channel have an attenuation $A_1$ of 18 dB in the channel preceding it and in that following it. In this case, if synchronization has proved impossible on the reference channel $C_r$, it is of no benefit to attempt to synchronize on the preceding channel $C_{r-1}$ or the subsequent channel $C_{r+1}$ if their power is less than that of the reference channel reduced by 18 dB.

To this end the control circuit 4 has access to a series of predetermined values referred to herein as ith attenuation factors where i varies from 1 to n and n is at least equal to 1. These attenuation factors can be based on a standard or can derive from the radio communication system if they are not covered in a standard, for example. They can equally well be determined empirically. A practical solution is to store these attenuation factors in the channel memory 6.

Figure 2:
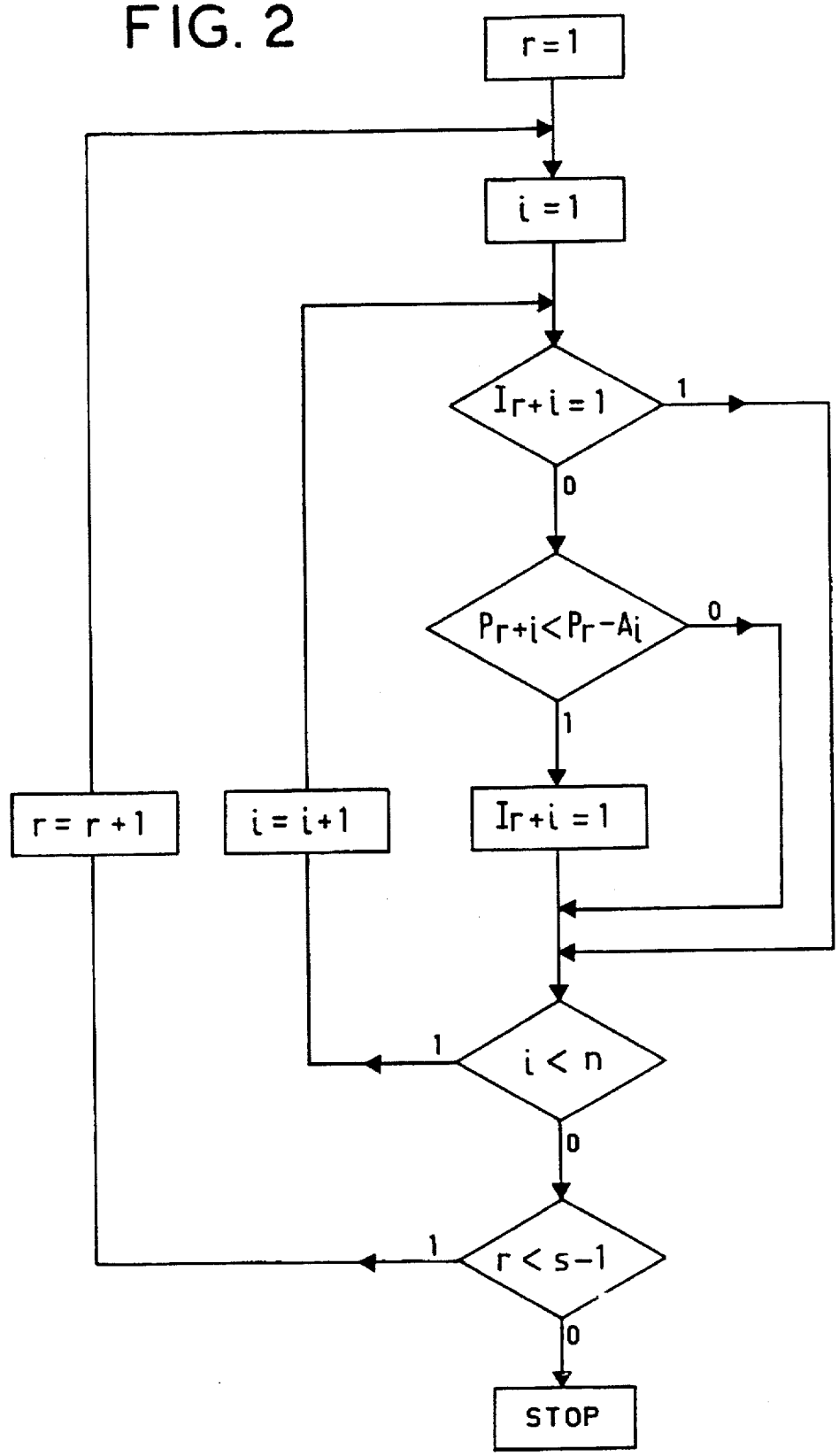
FIG. 2 is a block schematic showing one embodiment.

Referring to FIG. 2, the control circuit 4 selects the first channel from the list $C_1$ in the working memory 5 and reads its power $P_1$. It then reads the power $P_2$ of the channel $C_2$. If the latter is less than $P_1$ reduced by the 1st attenuation factor $A_1$, the second channel $C_2$ is eliminated from the list. This can be done by setting to "1" an indicator $I_2$, i.e. a specific bit of the record at the corresponding address in the working memory. Otherwise, the second channel $C_2$ is retained in the list, of course.

The control circuit 4 then reads the power $P_3$ of the third channel $C_3$. If the latter is less than $P_1$ reduced by the 2nd attenuation factor $A_2$, the third channel $C_3$ is eliminated from the list by means of the indicator $I_3$.

The control circuit 4 continues in this way up to the (n+1)th channel $C_{n+1}$, since n attenuation factors are used.

The control circuit 4 then considers the next channel in the list that has not been eliminated. This might be the second channel $C_2$, the third channel $C_3$ or any other channel. It takes this channel as the reference channel $C_r$. It reads the power $P_r$ of that channel. It then selects the first subsequent channel that has not been eliminated from the list. This might be the (r+1)th channel, but this is not necessarily so. Assume, therefore, that it is the (r+i)th channel $C_{r+i}$. It reads the power $P_{r+i}$ of that channel. If the latter is less than $P_r$ reduced by the ith attenuation factor $A_i$, then the (r+i)th channel $C_{r+i}$ is eliminated from the list by means of the indicator $I_{r+i}$. The control circuit repeats this operation of comparison with the power $P_r$ up to the (r+n)th channel $C_{r+n}$.

After examining the successors $C_{r+i}$ of the reference channel $C_r$, the control circuit 4 examines its predecessors $C_{r-i}$, provided that r−i is greater than 1. It therefore selects the first channel preceding the reference channel $C_r$ that has not been eliminated from the list. This might be the (r−1)th channel, but this is not necessarily so. Assume that it is the (r−i)th channel $C_{r-i}$. It reads the power $P_{r-i}$ of that channel.

If the latter is less than $P_r$ reduced by the ith attenuation factor $A_i$, then the (r−i)th channel $C_{r-i}$ is eliminated from the list by means of the indicator $I_{r-i}$. The control circuit repeats this operation of comparison with the power $P_r$ up to the (r−n) th channel $C_{r-n}$.

Generalizing the above, the control circuit 4 analyzes the power of the n channels that follow and the n channels that precede a channel from the list that have not been eliminated from the list in the previous stage. It does this for all the receive channels up to the penultimate channel, which is the (s−1)th channel.

In a different embodiment of the invention all of the receive channels are examined without regard to whether the corresponding indicators have been set to "1" or not.

Regardless of the solution adopted, the result of this selection stage is a modified list containing a number of records that is usually less than the number in the original list and at most equal to that number.

Following the selection stage, the control circuit 4 operates in the manner that is known in itself but considering only those channels in the list for which the indicator $I_r$ is not set to "1". It classifies the channels in the working memory 5 in order of decreasing power, retaining for each of them an indication of the corresponding set point value. The result of this operation is a list of set point values classified in order of decreasing power in the corresponding channels.

The control circuit 4 produces the first item from the list as the adjustment signal and then commands the terminal in a manner that is known in itself to attempt to synchronize to the corresponding channel. If the attempt succeeds the objective is achieved, whereas if it fails it starts again taking the second item from the list, and proceeds in the same way as far as the end of the list. If synchronization has not been acquired all of the list has been used, the control circuit 4 starts all of the operations described above again, beginning by measuring the power of all the channels again.

The invention has been described as if the initial list were to contain all of the receive channels. This is not essential, and the invention applies equally well if the list is the result of a first sorting operation based on other criteria.

Furthermore, it is assumed above that the selection stage is completed before any attempt at synchronization. This is merely one of many possible embodiments.

The control circuit 4 can begin by classifying the receive channels in order of decreasing power to draw up the original list. Remember that the index r of the channel $C_r$ always identifies the rank of that channel in the sequence of channels classified in order of increasing frequency. This circuit therefore attempts to synchronize to the first channel in the list, which is the reference channel $C_r$.

If this attempt succeeds the procedure can terminate there, but in some cases it is desirable to know all of the channels to which synchronization can be achieved. Accordingly, the control circuit 4 then compares the power $P_{r-i}$ of the channel $C_{r-i}$ to that $P_r$ of the reference channel and if the former is less than the latter reduced by the ith attenuation factor $A_i$, it eliminates the (r−i)th channel. It then performs the same operation for the channel $C_{r+i}$ as already described. The comparisons are naturally carried out for all values of i.

At present, the control circuit 4 attempts to synchronize to the first subsequent receive channel that has not been eliminated from the list. The procedure is then repeated identically for all the neighboring channels that have not been eliminated.

The succession of attempted synchronization and selection of adjoining channels is repeated in this way until all of the list has been used.

I claim:

1. A synchronization device for a terminal of a radio communication system adapted to identify a control channel constituting one of a plurality of receive channels by means of a receiver, comprising means to measure the power of said receive channels and means for attempting synchronization to at least some of said channels identified in a list, said system being such that a reference channel of nominal power, at its i-th predecessor and its i-th successor, has an i-th attenuation when said receiver is tuned to said reference channel, and further comprising means for eliminating from said list said i-th predecessor when the power thereof is less than the nominal power of said reference channel reduced by said i-th attenuation and for eliminating from said list said i-th successor when the power thereof is less than the nominal power of said reference channel reduced by said i-th attenuation.

2. A method of synchronizing a terminal to a base station of a radio communication system comprising:

determining a set of channels for synchronization, said channels including a reference channel and an i-th successor channel of said reference channel;

measuring a first receive power at said terminal for said reference channel;

measuring a second receive power at said terminal for said i-th successor channel;

designating as presently unusable said i-th successor channel when said second receive power is less than said first receive power by at least an i-th attenuation of said first receive power; and attempting said synchronization to said base station using only said channels which are free of said designation.

3. The method of synchronizing of claim 2, wherein:

said set of channels further comprises an i-th predecessor channel of said reference channel;

said method further comprises:

measuring a third receive power at said terminal for said i-th predecessor channel;

designating as presently unusable said i-th predecessor channel when said third receive power is less than said first receive power by at least said i-th attenuation of said first receive power.

* * * * *